(12) United States Patent
Choy

(10) Patent No.: US 6,256,636 B1
(45) Date of Patent: Jul. 3, 2001

(54) OBJECT SERVER FOR A DIGITAL LIBRARY SYSTEM

(75) Inventor: David Mun-Hien Choy, Los Altos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/979,061

(22) Filed: Nov. 26, 1997

(51) Int. Cl.[7] .................................................. G06F 17/30
(52) U.S. Cl. ............................................. 707/103; 707/10
(58) Field of Search .................................. 707/103, 9, 8, 707/1, 10

(56) References Cited

U.S. PATENT DOCUMENTS

| 5,058,000 | 10/1991 | Cox et al. | 707/10 |
| 5,097,533 | 3/1992 | Burger et al. | 5/640 |

(List continued on next page.)

FOREIGN PATENT DOCUMENTS

| 0 624 964 A1 | 11/1994 | (EP) . |
| 0 682 318 A1 | 11/1995 | (EP) . |

OTHER PUBLICATIONS

The NFS™ Distributed File Service, NFS White Paper, Mar. 1995.

IBM ImagePlus VisualInfo Information and Planning Guide, 1994 and 1995.

IBM ImagePlus VisualInfo Application Programming Reference, vol. 1, pp. 1–46, 1993–1995.

ERwin/Navigator User's Guide, pp. 1–7, 1996.

IBM Digital Library, Application Programming Guide for AIX and IRIX, Version 1, Document No. SC26–8654–00, pp. 1–134, 1996.

IBM Digital Library, Integrating Multimedia Server for AIX, Version 1, Document No. GC26–8872–01, pp. 1–23, 1996.

IBM Database 2, SQL Reference For Common Servers, Version 2, pp. 25–75, 1994–1995.

R. Agrawal, et al., Mining Sequential Patterns, IBM Almaden Research Center, pp. 1–12, Mar. 1995.

R. Srikant, et al., Mining Sequential Patterns: Generalizations and Performance Improvements, IBM Almaden Research Center, pp. 1–15, Mar. 1996.

I. Kojima et al., Implementation Of An Object–Oriented Query Language System . . . Interface, IEEE, pp. 79–86, 1991.

A. Dogac et al., A Multidatabase System Implementation On CORBA, IEEE, pp. 2–11, 1996.

J.T. Anderson et al., Generic Database Interface (GDI) User Manual, Special Technical Report, Feb. 25, 1994.

D. Hollingsworth, Workflow Management Coalition—The Workflow Reference Model, Document No. TC00–1003, pp. 1–44, Nov. 28, 1994.

A.L. Scherr, A New Approach To Business Processes, IBM Systems Journal, vol. 32, No. 1, pp. 80–98, 1993.

C. Mohan, et al., Exotica: A Research Perspective On Workflow Management Systems, Data Engineering, vol. 18, No. 1, pp. 1–6, Mar. 1995.

(List continued on next page.)

*Primary Examiner*—Thomas G. Black
*Assistant Examiner*—Frantz Coby
(74) *Attorney, Agent, or Firm*—Merchant, Gould, Smith, Edell, Welter & Schmidt

(57) ABSTRACT

A digital library is comprised of a library server and at least one object server. The library server stores tables describing the digital library. An object server stores objects referenced by the tables describing the digital library. An application is coupled to the library server and the object server(s). It accesses objects via a file system or other native storage manager API under the control of the library server.

12 Claims, 7 Drawing Sheets

U.S. PATENT DOCUMENTS

| | | | |
|---|---|---|---|
| 5,115,501 | 5/1992 | Kerr | 707/9 |
| 5,129,086 | 7/1992 | Coyle, Jr. et al. | 395/682 |
| 5,182,705 | 1/1993 | Barr et al. | 705/11 |
| 5,216,592 | 6/1993 | Mann et al. | 705/8 |
| 5,265,252 | 11/1993 | Rawson, III et al. | 395/681 |
| 5,278,978 | 1/1994 | Demers et al. | 707/101 |
| 5,301,320 | 4/1994 | McAtee et al. | 705/9 |
| 5,319,543 | 6/1994 | Wilhelm | 705/3 |
| 5,327,529 | 7/1994 | Fults et al. | 345/335 |
| 5,408,652 | 4/1995 | Hayashi et al. | 707/1 |
| 5,414,843 | 5/1995 | Nakamura et al. | 707/104 |
| 5,414,847 | 5/1995 | Tsukakoshi | 705/1 |
| 5,455,948 | 10/1995 | Poole et al. | 707/102 |
| 5,535,332 | 7/1996 | Ishida | 395/712 |
| 5,535,389 | 7/1996 | Elder et al. | 395/712 |
| 5,548,506 | 8/1996 | Srinivasan | 705/8 |
| 5,581,691 | 12/1996 | Hsu et al. | 714/45 |
| 5,630,069 | 5/1997 | Flores et al. | 705/7 |
| 5,787,413 * | 7/1998 | Kauffman et al. | 707/2 |
| 5,832,499 * | 11/1998 | Gustman | 707/103 |
| 5,835,667 * | 10/1998 | Wactlar et al. | 386/96 |

OTHER PUBLICATIONS

A.V. Aho, The Transitive Reduction Of A Directed Graph, SIAM J. Comput, vol. 1, No. 2, pp. 131–137, Jun. 1972.

F. Leymann, et al., Managing Business Processes As An Information Resource, IBM Systems Journal, vol. 33, No. 2, pp. 326–348, 1994.

* cited by examiner

OBJECT SERVER FOR A DIGITAL LIBRARY SYSTEM

CROSS-REFERENCE TO RELATED APPLICATIONS

This application is related to application Ser. No. 08/936,172, entitled "AN EXTENSIBLE DIGITAL LIBRARY", filed Sep. 25, 1997, by David Mun-Hien Choy, assigned to IBM Corporation, and now U.S. Pat. No. 6,021,410 which application is incorporated by reference herein.

This application is also related to application Ser. No. 08/936,172, entitled "SYSTEM INTEGRATION, APPLICATION AND SOLUTION DEVELOPMENT FOR HETEROGENEOUS INFORMATION SYSTEMS ", filed Nov. 7, 1997, by David Mun-Hien Choy, assigned to IBM Corporation, and having attorneys' docket number AM9-97-042, which application is incorporated by reference herein.

BACKGROUND OF THE INVENTION

1. Field of the Invention

Digital libraries and content management systems need to support large objects as components of high-level concepts such as documents. These objects are typically accessible through an application programming interface (API) provided by the system. This design causes performance and interfacing problems, as well as high costs to ingest legacy objects into the system. This invention offers an object server that provides a cache with a file-based fast-path to the objects stored in the object server, without compromising the integrity of the system, including a content model, constraints, and access control.

2. Description of Related Art

A network-based system, such as the World Wide Web, a content management system, such as the document/image management system VisualInfo™, or a multimedia library system, such as a digital library, usually provides Library Server functions as well as Object Server functions. These functions can run on one or more network server nodes.

A Library Server typically supports a high-level content model, handles access control, manages transactions, and performs other functions. An Object Server, on the other hand, supports a large, scaleable repository of objects which are components of the high-level content model maintained by Library Server. To protect the content, for integrity (model, functions, relationships, constraints) and security (access control), these objects are normally accessible only through the API provided by the system.

While this design is rational, it creates a number of performance and interface problems when the system is used to support large applications. These problems include:

1. An object is often copied several times on the way to or from an Object Server, passing from one software component or process to another.
2. An application cannot access an Object Server directly if the API is not available on the client computer executing the application. This is the case in the World Wide Web environment.
3. There is no direct delivery of object to a third party. For example, one or more originating applications may interactively select objects for asynchronous or deferred processing (e.g., batch processing) by another application which does not have the same Library Server access privileges as the originating applications. The originators must retrieve the objects and send them to the other application, i.e., the latter has to get the objects indirectly.
4. Most third-party applications and tools use and access files. A proprietary API prevents inter-operation and integration.
5. It is expensive to load a large amount of legacy objects, usually files, into the system.

These difficulties are sought to be minimized by the present invention.

SUMMARY OF THE INVENTION

To overcome the problems discussed above, and to overcome other problems in the art, the present invention discloses a method, apparatus, and article of manufacture for novel access to an Object Server using a Cache. The Cache is performed within a File System that is accessible, preferably directly, by the content management system, namely the Library Server, as well as by the Applications. The File System can be locally executed on a server, remotely executed on a server in a network, or distributed and executed across multiple servers on a network, such as NFS (Network File System), AFS (Andrew File System) and DFS (Distributed File System). File access can be local file I/O, or FTP (File Transfer Protocol) plus local file I/O.

There can be multiple Object Servers, wherein each Object Server may use a separate, and possibly different, file system and may support different APIs, Library Servers, and Applications. There can be multiple Caches for an Object Server, including both persistent Caches and temporary Caches.

A direct access to the objects of the Object Server, via the Cache, is available using a native File System interface as a "fast path". This fast path is controlled by the Library Server and is selectively and explicitly enabled for an Application when a specific, intended file access is determined to be "safe", i.e., when the access does not pose any risk in damaging the integrity of the library content regarding the model, functions, relationships and constraints, and is consistent with the Application's privilege regarding the target object as managed by the system.

BRIEF DESCRIPTION OF THE DRAWINGS

Referring now to the drawings in which like reference numbers represent corresponding elements throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware and Software Environment

Figure 1:
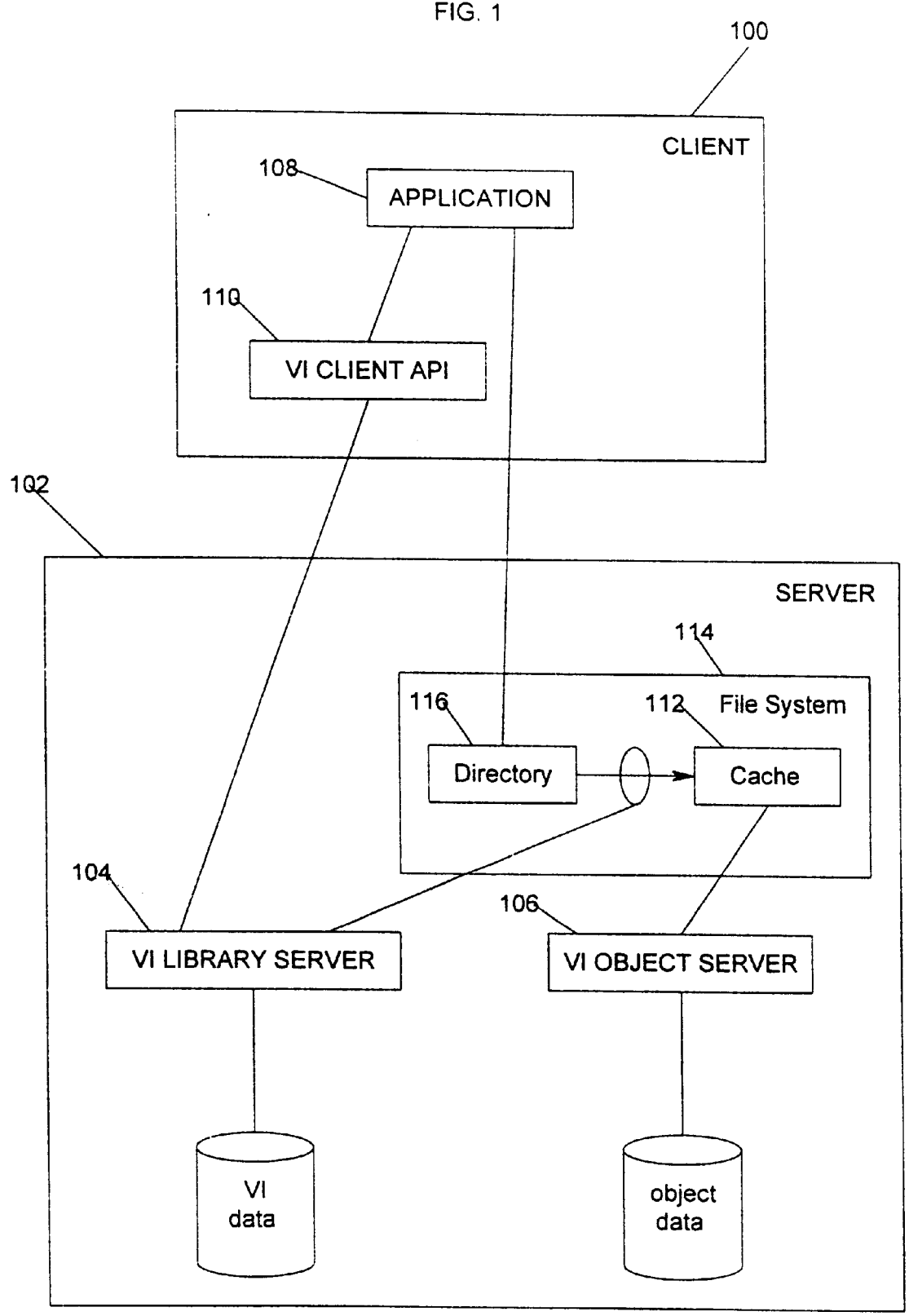
FIG. 1 is an exemplary hardware and software environment used to implement the preferred embodiment of the invention, and illustrates the main characteristics of the system, as used for object loading.
Figure 2:
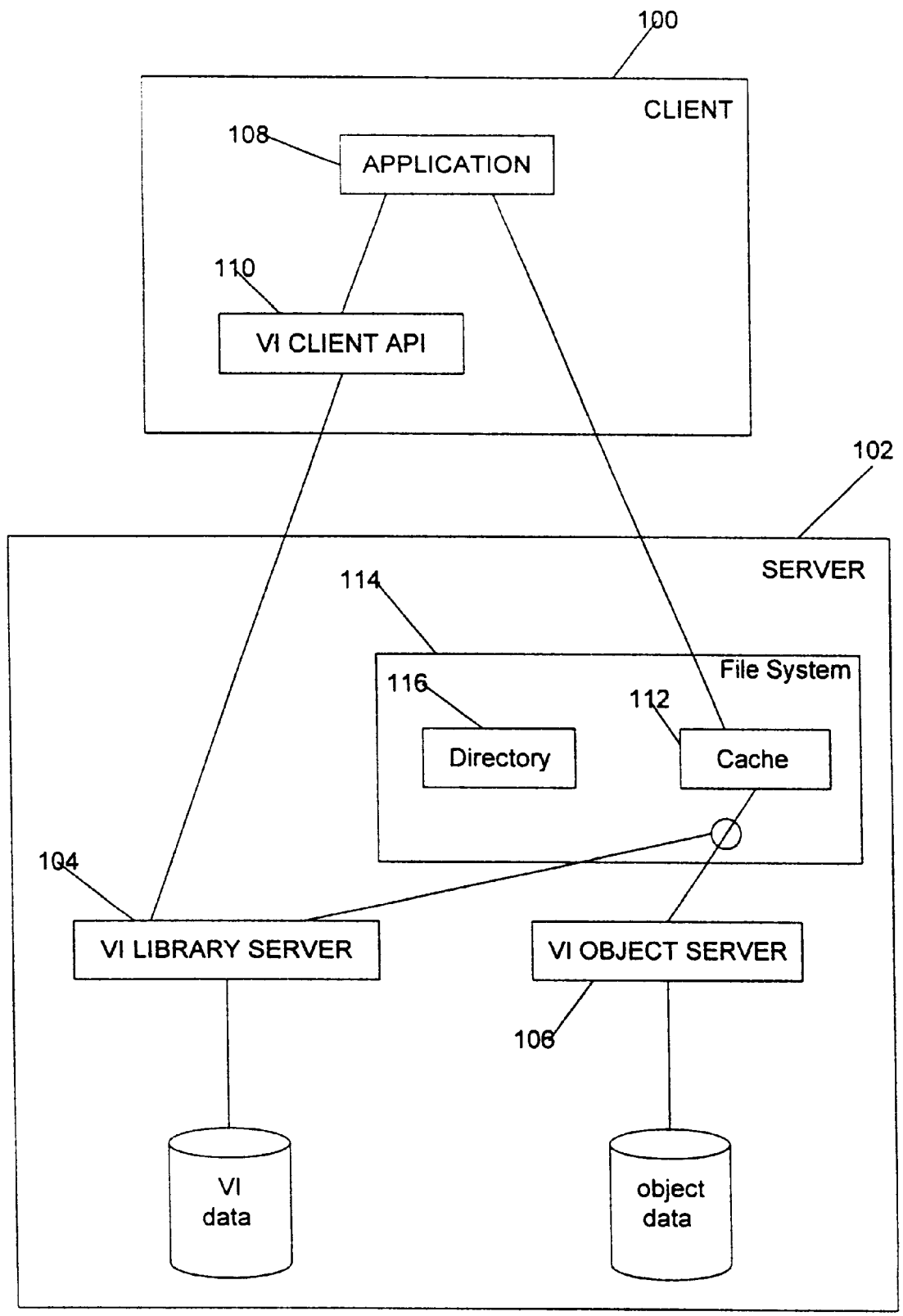
FIG. 2 is an exemplary hardware and software environment used to implement the preferred embodiment of the invention, and illustrates the main characteristics of the system, as used for object retrieval according to a first method.
Figure 3:
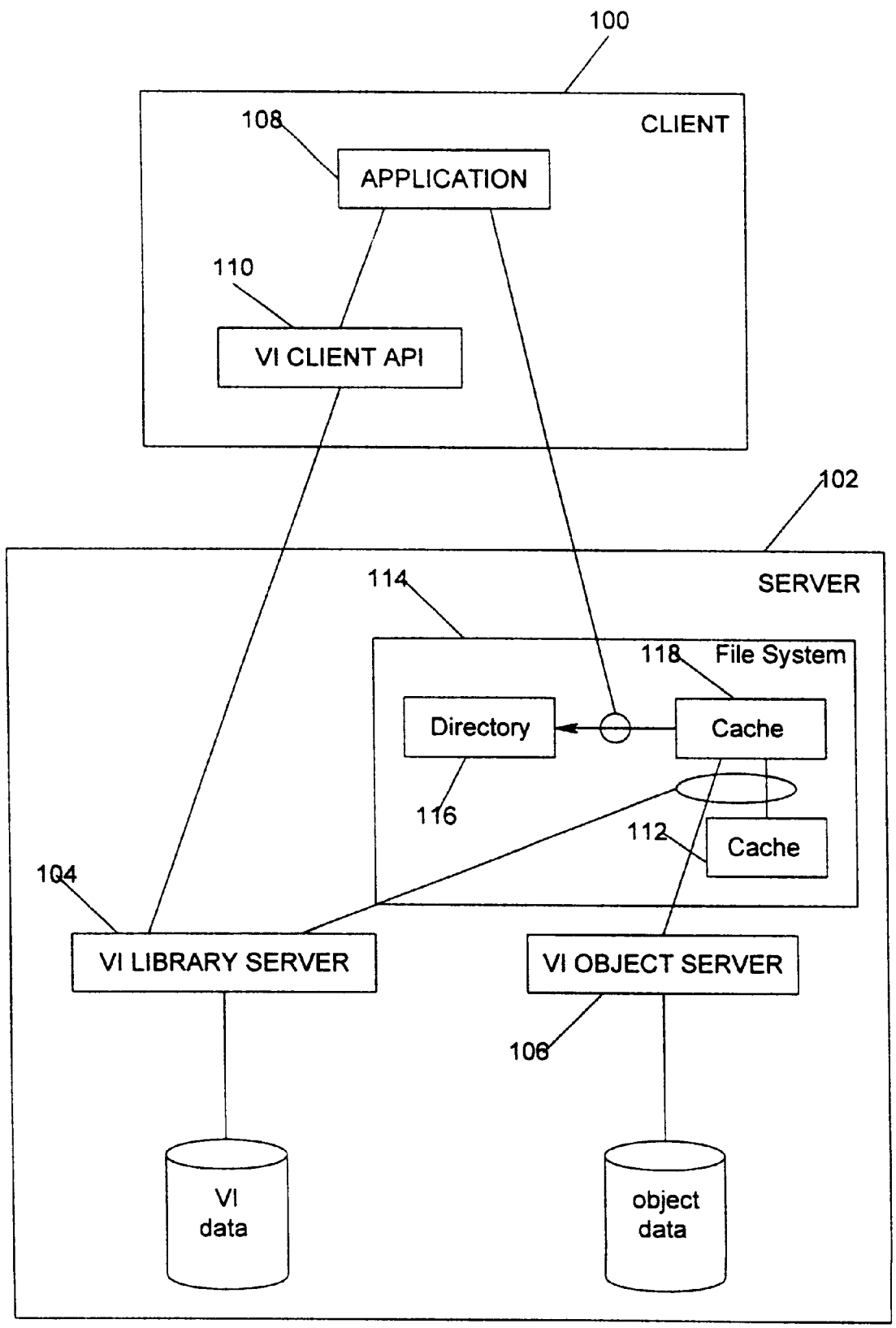
FIG. 3 is an exemplary hardware and software environment used to implement the preferred embodiment of the invention, and illustrates the main characteristics of the system, as used for object retrieval according to a second method.

FIGS. 1, 2, and 3 are block diagrams that illustrate an exemplary hardware and software environment used to implement the preferred embodiment of the invention. The present invention comprises a VisualInfo™ digital library system that is typically implemented using a client computer 100 and/or server computer 102. Both the client 100 and server 102 generally include, inter alia, one or more processors, random access memory (RAM), data storage devices, data communications devices, and other peripherals. Those skilled in the art will recognize that any combination of the above components, or any number of different components, peripherals, and other devices, may be used with either the client 100 or server 102.

The present invention is generally implemented using inter-related computer programs executed by both the client and server 102. These computer programs include at least one Library Server 104 and at least one Object Server 106. These servers 104 and 106 usually communicate indirectly with an Application 108 via at least one Client API 110, which in turn, communicates directly or indirectly with an Application 108. More information concerning each of the above-identified components is provided below.

All of the computer programs are comprised of instructions which, when read and executed by a computer, cause the computer to perform the steps necessary to implement and/or use the present invention. Generally, the computer programs are tangibly embodied in and/or are readable from a device, carrier, or media, such as memory, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass computer programs accessible from any computer-readable device, carrier, or media. Of course, those skilled in the art will recognize many modifications may be made to this configuration without departing from the scope of the present invention.

Those skilled in the art will also recognize that the exemplary environment illustrated in FIGS. 1, 2, and 3 are not intended to limit the present invention. Further, those skilled in the art will recognize that other alternative hardware and software environments may be used without departing from the scope of the present invention.

Application

The Application 108 provides the end-user interface for the functionality performed by the other components of the digital library system. Thus, the Application 108 provides a mechanism for managing catalogs, folders, documents, objects, and other elements of the digital library system.

In the data model provided by the digital library system, for document management for example, the most basic components are documents, folders, work baskets, and work flows. Documents are similar to paper documents. Folders are similar to folders in a paper filing system and can contain other folders or documents. A work flow is a series of work baskets or queues that contain documents and folders to be processed. Depending on end-user's level of access to these elements, the following operations, using the Application 108, can be performed: storing a document, indexing a document or folder, processing a document or folder, retrieving a document or folder, deleting a document or folder, processing work flows and work baskets, etc.

Other data models can be supported by the digital library system, such as a card catalog.

Generally, an end-user can write their own Application 108 or use a predefined Application 108. Moreover, it is anticipated that a pre-defined Application 108 can be configured or customized via user exits and other techniques.

The Application 108 could also comprise a System Administration Program that permits configuration of the VisualInfo™ digital library system. Such a System Administration Program could configure both hardware and software resources in the system, control the level of access that end-users have to the system, and provide other administrative functions.

VI Client API

The VI Client API 110 provides the functions necessary for the Application 108 to interact with the VI Library Server 104 and the VI Object Server 106. Using the VI Client API 110, the Application 108 can command the VI Library Server 104 and VI Object Server 106 to perform digital library functions, including storing a document, indexing a document or folder, processing a document or folder, retrieving a document or folder, deleting a document or folder, processing work flows and work baskets, etc.

VI Library Server

The VI Library Server 104 maintains the contents of the digital library and provides data integrity by performing the following finctions: managing the data structures of the digital library; maintaining index information; and controlling access to objects, such as documents, stored in the VI Object Server 106. The VI Library Server 104 is typically built upon relational database management system (RDBMS) technology, such as DB2™.

VI Object Server

Each VI Object Server 106 is associated with a VI Library Server 104 and maintains object data (usually document objects) that are referenced by the tables comprising VI data that are maintained by the Library Server 104. This combination of VI data and object data generally comprises a "digital library." The VI Object Server 106 receives requests from the Application 108 via the VI Library Server 104 and then communicates the results from those requests to the Application 108 via the VI Client API 110.

Operation of the System

In addition to the above components, the present invention includes a persistent Cache 112 for the VI Object Server 106 which is accessible directly by the Application 108 in a manner more fully described below with respect to the flowchart of FIG. 4. The persistent Cache 114 is preferably included within a File System 114 executed by the server 102 (or alternatively, the client 100). In effect, the Cache 114 also operates as a second or supplementary Object Server for objects stored in the Object Server 106.

Figure 4:
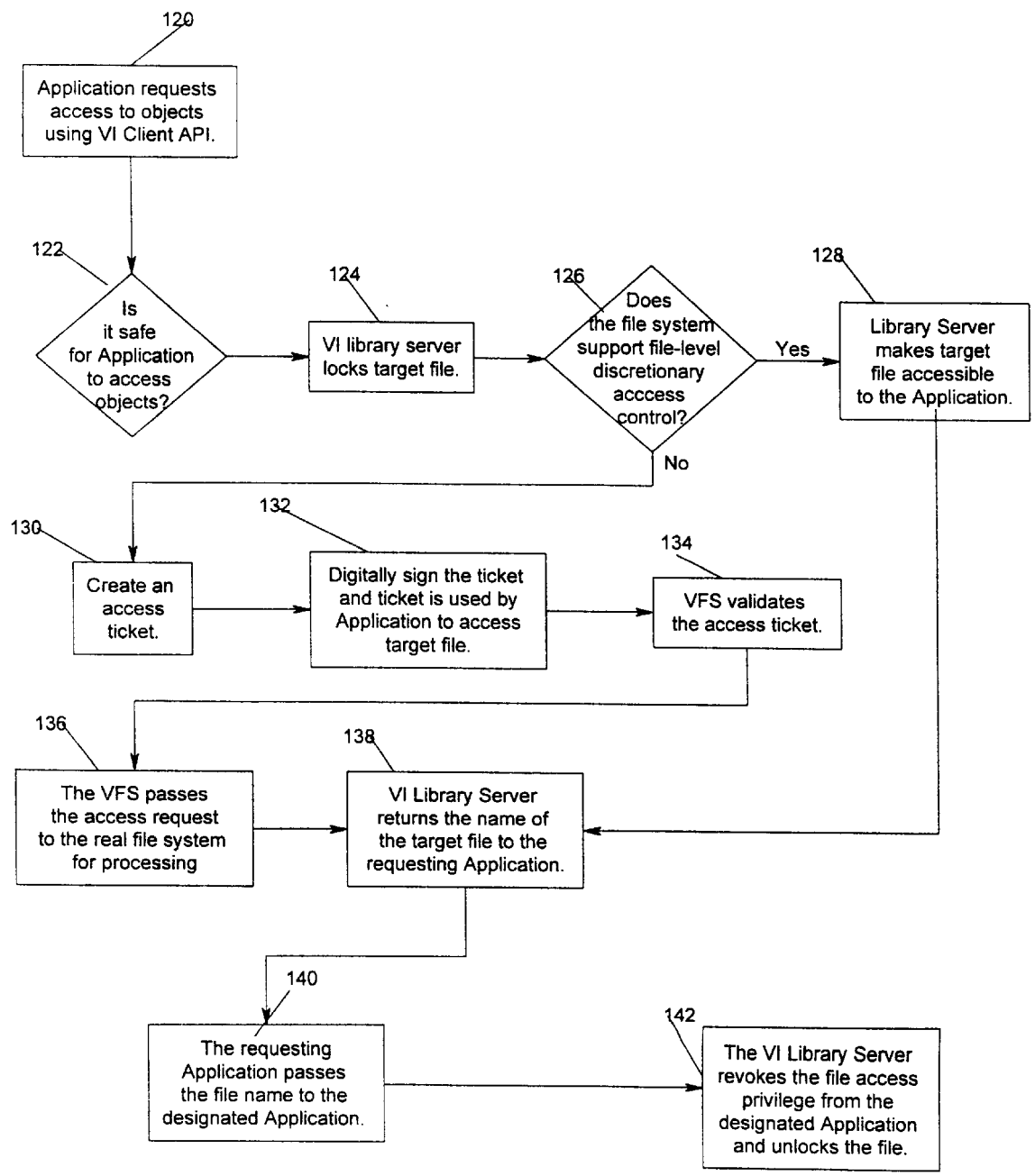
FIGS. 4–7 are flow charts showing respectively an object server using a cache, object loading, and a first method and second method for object retrieval.

FIG. 4 is a flowchart illustrating preferred logic for requesting desired objects. At block 120, the Application 108 first requests access to the desired objects using the VI Client API 110. Control transfers to block 122 which represents the Application 108 determining whether it is safe for the Application 108 to access the desired objects. If so, control transfers to block 124 which represents the VI Library Server 104 locking the target file that is appropriate for access. Control then transfers to block 126 which represents the VI Library Server 104 determining whether the File System 114 supports file-level discretionary access control, such as NFS, AFS, and DFS. If so, control transfers to block 128; otherwise control transfers to block 130. Block 128 represents the VI Library Server 104 rendering the target file accessible to an Application 108 designated by the requesting Application 108 (they may or may not be the same Application 108). This is done by granting the Application 108 a native file access privilege. From block 128, control transfers to block 138, discussed below.

If the File System 114 does not have file-level discretionary access capability, such as the file systems found in the AIX and UNIX operating systems, then control transfers to block 130 where an access ticket is created. This ticket contains the activation condition such as the target file name, designated Application 108, allowed file operation, the effective and expiration time, how many times the file can be accessed, etc. Control then transfers to block 132 which represents the ticket being digitally signed and used by the designated Application 108 to access the target file. Control then transfers to block 134 which represents a VFS (Virtual File System), which is mounted in front of the real file system to trap file accesses, validating the ticket at file-access time. Upon successful validation of the ticket, control transfers to block 136 which represents the VFS passing the access request to the real file system for processing. DAC-MLink™ technology can be used in this case. The access ticket and VFS are not needed when there is file-level discretionary access.

Control then transfers to block 138 which represents the VI Library Server 104 returning the name of the target file to the requesting Application 108. Where there is an access ticket, the access ticket is imbedded. Control transfers to block 140 which represents the requesting Application 108 passing the file name to the designated Application 108, which can then access the target file directly. After a designated duration, control then transfers to block 142 which represents the revoking of the file access privilege from the designated Application 108 and the unlocking of the file.

A file access request which is not considered "safe" is rejected. In such a case, the Application 108 uses the system-provided VI Client API 110 to access the desired data. For example, an Application 108 that is only allowed to append but not arbitrarily alter an object is not allowed to directly append the file if the file system does not distinguish a file append from a file update (read/write access).

This design requires a specific implementation for each type of File System 114. This is intentional so that unique features of each File System 114 can be exploited including its access control capability.

The exemplary design for the IBM VisualInfo™ and Digital Library™ products, which share the same File System 114, is further described with reference to FIGS. 1, 2, and 3.

Object Loading and Insertion

Figure 5:
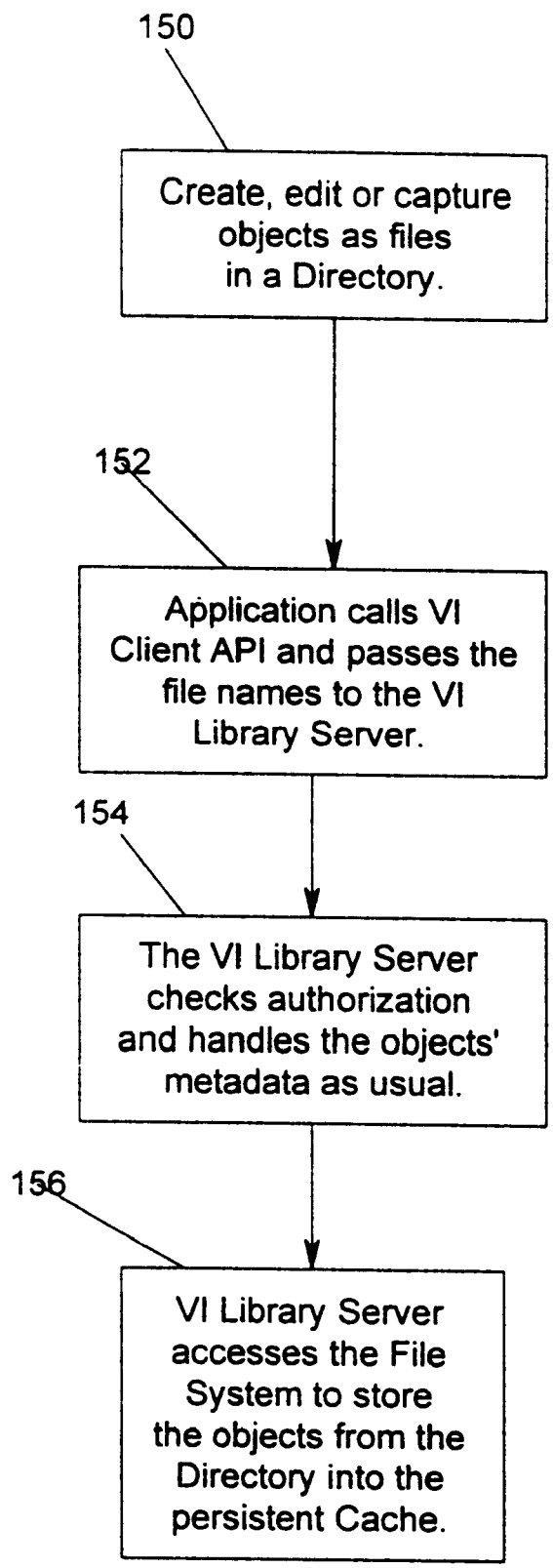

FIG. 5 is a flowchart illustrating preferred logic for loading and inserting an object. At block 150, objects are first created, edited, or captured (e.g., by scanning) as files in a Directory 116 associated with an Application 108. The Directory 116 resides in the same File System 114 as the persistent Cache 112. When these objects are ready for loading into the system, control transfers to block 152 which represents the Application 108 calling the VI Client API 110 and passing the file names to the VI Library Server 104. Control transfers to block 154 which represents the VI Library Server 104 checking the authorization and handling the objects' metadata as usual.

When it is ready to accept the objects, control transfers to block 156 which represents the VI Library Server 104 accessing the File System 114 to store the objects from the Directory 116 into the persistent Cache 112. From here, the objects may be moved to or from the Directory 116 and/or the Cache 112, either by physically moving the files or merely by changing file metadata without actually copying the files themselves. The objects in the cache 112 can be accessed as files through the Library Server 104.

Further, the objects can be migrated or replicated from the persistent Cache 112 to or from tertiary storage or the Object Server 106, if desired. These functions are asynchronous and can be performed automatically or on command from the Application 108.

Once loaded into the system, the objects are not only accessible as a file to the Application 108, they are catalogued and/or controlled by the VI Library Server 104 once they are stored in the VI Object Server 106. Thus, using the present invention, object loading can be extremely fast. Moreover, it is easy and efficient to ingest legacy objects into the system.

Object Retrieval

Figure 6:
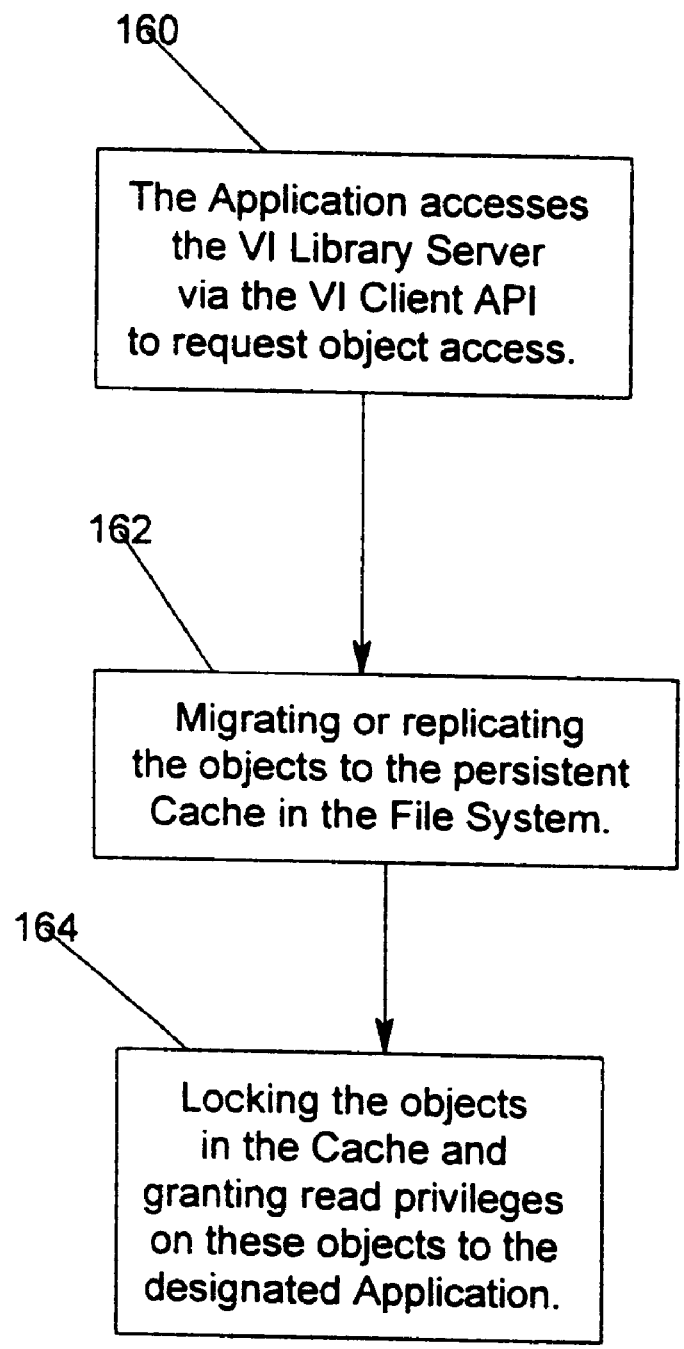

There are two methods to retrieve an object according to the present invention. Method 1, as illustrated in FIGS. 2 and 6, is optimal when an Application 108 does not need to create a private working copy of the object, such as to perform text indexing, to display/print/distribute an object, or to create a derivative (e.g., a thumbnail). Method 2, as illustrated in FIGS. 3 and 7, is optimal when the Application 108 needs to obtain a private working copy of the object.

Figure 7:
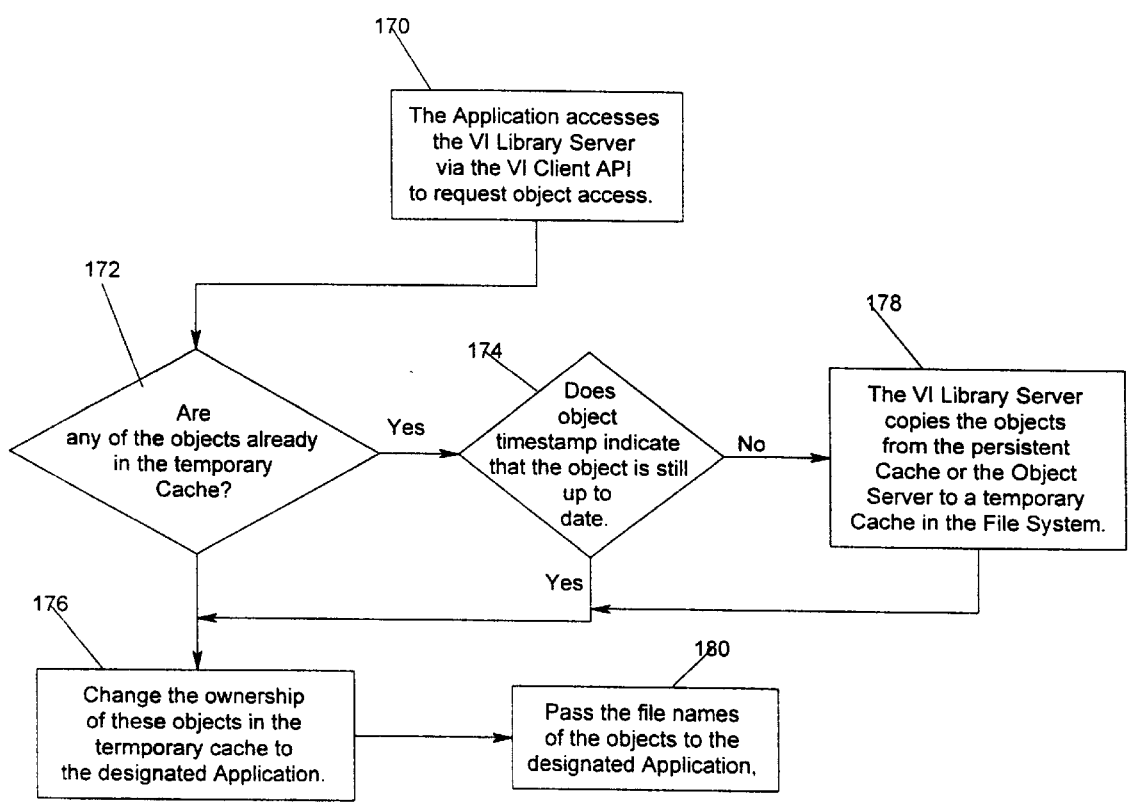

FIGS. 6 and 7 illustrate flowcharts for retrieving an object in accordance with preferred embodiments of methods 1 and 2, respectively. In both methods, at blocks 160 and 170, the Application 108 first accesses the VI Library Server 104 via the VI Client API to request object access. This can occur after performing search, access control, navigation, check-out, and other operations.

After the VI Library Server 104 has verified the access privileges of the requesting Application 108, it makes the target objects available as files to the designated Application 108 in the persistent Cache 112, and from there to the Directory 116, and then returns the file names to the Application 108.

Method 1

Method 1 is shown in FIG. 6. After the Application 108 first accesses the VI Library Server 104, control transfers to block 162 which represents the migrating or replicating of the objects to the persistent Cache 112 in the File System 114 that is accessible by the designated Application 108 if the objects are not already there. Control then transfers to block 164 which represents locking the objects in the Cache 112 and granting read privileges on these objects to the designated Application 108. Objects can be pre-staged, migrated, or replicated to the persistent Cache 112 from a tertiary storage or from the Object Server 106 on command or in response to specified rules executed by the Application 108. Alternatively, access tickets are created for these objects and the tickets are embedded in the names returned to the requesting Application 108.

Method 2

In Method 2 the VI Library Server 104 copies objects from the persistent Cache 112 or the Object Server 106 to a temporary Cache 116 in the File System 114 that is accessible by the designated Application 108. After the Application accesses the VI Library Server 104 at block 170, control transfers to decision block 172 which represents determining whether any of the objects to be copied from the persistent cache 112 are already in the temporary Cache 116. If so, control transfers to block 174, otherwise control transfers to block 176. Block 174 is a decision block checking the object timestamp to determine whether the object is still up-to-date. If the object is not up to date, control transfers to block 178; otherwise control transfers to block 176. Block 178 represents the VI Library server 104 copying the object from the persistent cache 112 to the temporary cache 118 in the file system 114. From block 178, control transfers to block 176

Block 176 represents changing the ownership of these objects in the temporary cache 118 to the designated Application 108, or alternatively, the designated Application 108 is granted a read-write privilege on these objects. Control transfers from block 176 to block 180 which represents the file names of the object being passed to the designated Application 108, which then uses them to read the target objects. In Method 2, the designated Application 108 can use the objects in the temporary Cache 116 directly or move them into the Directory 116*a*.

In Method 1, after a designated duration, the VI Library Server 104 revokes the access privileges of the designated Application 108 and unlocks the objects. In Method 2, any object in the temporary Cache 116 that is unclaimed after a certain duration can be purged.

Using Method 1, an object is copied zero or one time if the Application 108 does not need to create a working copy; otherwise, the object is copied one or two times. Using Method 2, an object is copied only once to create a working copy. Method 2 also does not require file locking and has a lower access control requirement from the File System 114.

Other Operations

Object deletion is unaffected by making the Cache 112 and the VI Object Server 106 available to both the Application 108 and the VI Library Server 104. Object replacement is a combination of object deletion and object insertion, plus updating the object's metadata.

Direct updates of objects, on the other hand, are usually not desirable for a content management system, since most systems need to allow read access to the "old" version of object while it is being updated. The scenario that an Application 108 checks-out an object, updates it outside the system, and then inserts it back into the system to replace the old version, appears to be a simpler paradigm both to a user and to the system with respect to transaction management locking, and recovery.

If direct update of an object is needed, it can be supported by extending retrieval via Method 1. This is affected by granting read-write (instead of read-only) privileges on the target object to the designated Application 108. DataLink™ technology is used to maintain the integrity of file references in the system.

The persistent Cache 112, which is created to act as a surrogate Object Server 106, solves the problems mentioned above. It provides fast object loading and retrieval, eases the ingesting of legacy objects, provides indirect access to an VI Object Server 106, etc. Furthermore, it enables full exploitation of the capabilities of the File System 114, there is no need to replicate the functions of the File System 114, and it allows simplification of the VI Client API 110.

In addition, a directory tree of files can be stored and retrieved as a single object. This is affected by using directory path name and directory access control instead of file name and file access control. For object migration and archiving, the entire tree can be packed into a single file. This design can be extended to streaming objects such as video and audio, by replacing the persistent cache 112 with a video server.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. A digital library, comprising:
   (a) at least one library server for storing tables describing the digital library;
   (b) at least one application programming interface, coupled to the library server, for providing an access path for an application to the stored tables of the library server;
   (c) at least one object server, coupled to the library server, for storing objects referenced by the stored tables of the library server; and
   (d) at least one cache, coupled to the object server, for providing an access path for an application to store and retrieve objects into and from the digital library, wherein the cache is directly accessible by the application and the library server and is implemented in a file system wherein objects are retrieved from the cache as files or directories of files by changing file metadata without copying the file.

2. The digital library of claim 1, wherein the object server is used in combination with the cache such that objects are accessed under the control of the library server when the cache is accessed.

3. The digital library of claim 1, wherein files or directories of files are stored into the digital library as objects via the cache by changing file metadata without copying file data.

4. The digital library of claim 1, wherein the cache is implemented in a specialized data manager.

5. The digital library of claim 4, wherein the specialized data manager is a video server.

6. The digital library of claim 1, wherein the cache replicates selective objects from the object server, and the replication is controlled by the library server.

7. The digital library of claim 1, wherein the cache is persistent.

8. The digital library of claim 7, wherein the persistent cache also functions as an object server.

9. The digital library of claim 7, further comprising a temporary cache, coupled to the object server and the persistent cache, for storing objects therein for selective access by the application.

10. The digital library of claim 1, wherein the library server selectively limits access to the objects in the cache.

11. A method for storing and accessing data in a digital library, comprising the steps of:
   (a) storing tables describing the digital library in at least one library server;
   (b) providing an access path for an application to the stored tables of the library server via at least one application programming interface coupled to the library server;
   (c) storing objects referenced by the stored tables of the library server in at least one object server coupled to the library server; and
   (d) providing an access path for an application to store and retrieve objects into and from the digital library via at least one cache coupled to the object server, wherein the cache is directly accessible by the application and the library server and is implemented in a file system wherein objects are retrieved from the cache as files or directories of files by changing file metadata without copying the file.

12. An article of manufacture comprising one or more computer program carriers tangibly embodying one or more computer programs that when read by one or more computers causes the computers to perform a method for storing and accessing data in a digital library, the method comprising the steps of:
   (a) storing tables describing the digital library in at least one library server;
   (b) providing an access path for an application to the stored tables of the library server via at least one application programming interface coupled to the library server;
   (c) storing objects referenced by the stored tables of the library server in at least one object server coupled to the library server; and
   (d) providing an access path for an application to store and retrieve objects into and from the digital library via at least one cache coupled to the object server, wherein the cache is directly accessible by the application and the library server and is implemented in a file system wherein objects are retrieved from the cache as files or directories of files by changing file metadata without copying the file.

* * * * *